US008892682B2

(12) United States Patent
Okuyama

(10) Patent No.: US 8,892,682 B2
(45) Date of Patent: *Nov. 18, 2014

(54) DOWNLOAD SYSTEM, INFORMATION PROCESSING TERMINAL, MANAGEMENT DEVICE, AND METHOD AND PROGRAM USED THEREFOR

(75) Inventor: Gen Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 294 days.

This patent is subject to a terminal disclaimer.

(21) Appl. No.: 13/140,849

(22) PCT Filed: Dec. 14, 2009

(86) PCT No.: PCT/JP2009/006838
§ 371 (c)(1),
(2), (4) Date: Jun. 20, 2011

(87) PCT Pub. No.: WO2010/073530
PCT Pub. Date: Jul. 1, 2010

(65) Prior Publication Data
US 2011/0252114 A1 Oct. 13, 2011

(30) Foreign Application Priority Data
Dec. 26, 2008 (JP) ................................ 2008-333276

(51) Int. Cl.
G06F 15/16 (2006.01)
G06F 15/173 (2006.01)

(52) U.S. Cl.
USPC ......................................... 709/217; 709/223

(58) Field of Classification Search
USPC ....................................................... 709/217
See application file for complete search history.

(56) References Cited

U.S. PATENT DOCUMENTS

| 8,060,470 B2* | 11/2011 | Davidson et al. ............. 707/634 |
| 2008/0040239 A1* | 2/2008 | Jacobi et al. ..................... 705/27 |
| 2008/0114861 A1* | 5/2008 | Gildred .......................... 709/219 |

FOREIGN PATENT DOCUMENTS

| JP | 11-232115 A | 8/1999 |
| JP | 2003316591 A | 11/2003 |
| JP | 2004094411 A | 3/2004 |
| JP | 2005327036 A | 11/2005 |

OTHER PUBLICATIONS

International Search Report for PCT/JP2009/006838 mailed Mar. 9, 2010.
G. Okuyama et al., "A Proposal and Evaluation of Adaptive Services Platform", The 7th Forum on Information Technology (FIT2008) Koen Ronbunshu, Separate vol. 1, Aug. 20, 2008, pp. 189-190.

* cited by examiner

*Primary Examiner* — John B. Walsh
(74) *Attorney, Agent, or Firm* — Sughrue Mion, PLLC

(57) ABSTRACT

A terminal includes: a call relationship transmission means for transmitting call relationship information, which indicates a call relationship regarding an application or content data executed in the terminal, to a management device; and a download means for downloading the application or content data on the basis of call relationship statistical information held in a call relationship statistic holding means. The management device includes the call relationship statistic holding means, which holds the call relationship statistical information indicating the statistic of the call relationship regarding the application or content data indicated by the call relationship information received from each terminal.

26 Claims, 13 Drawing Sheets

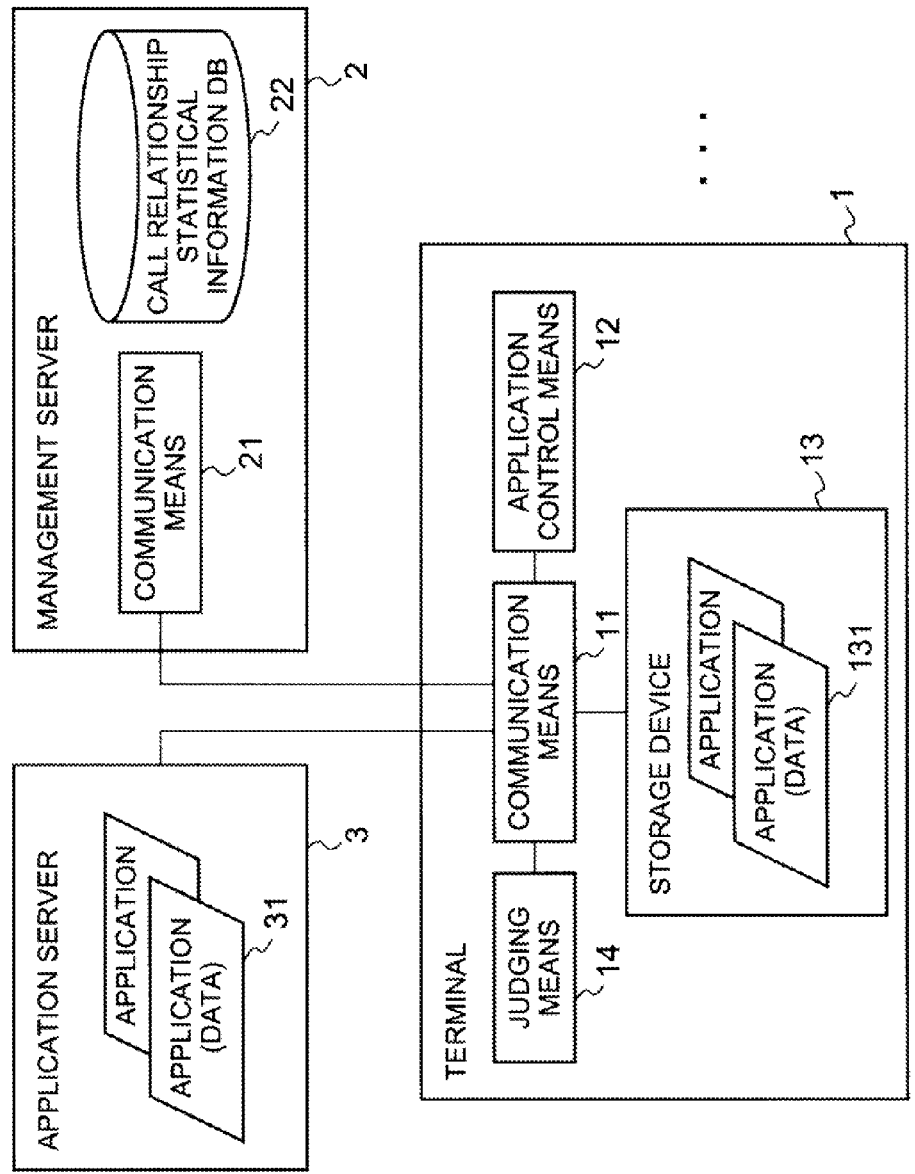

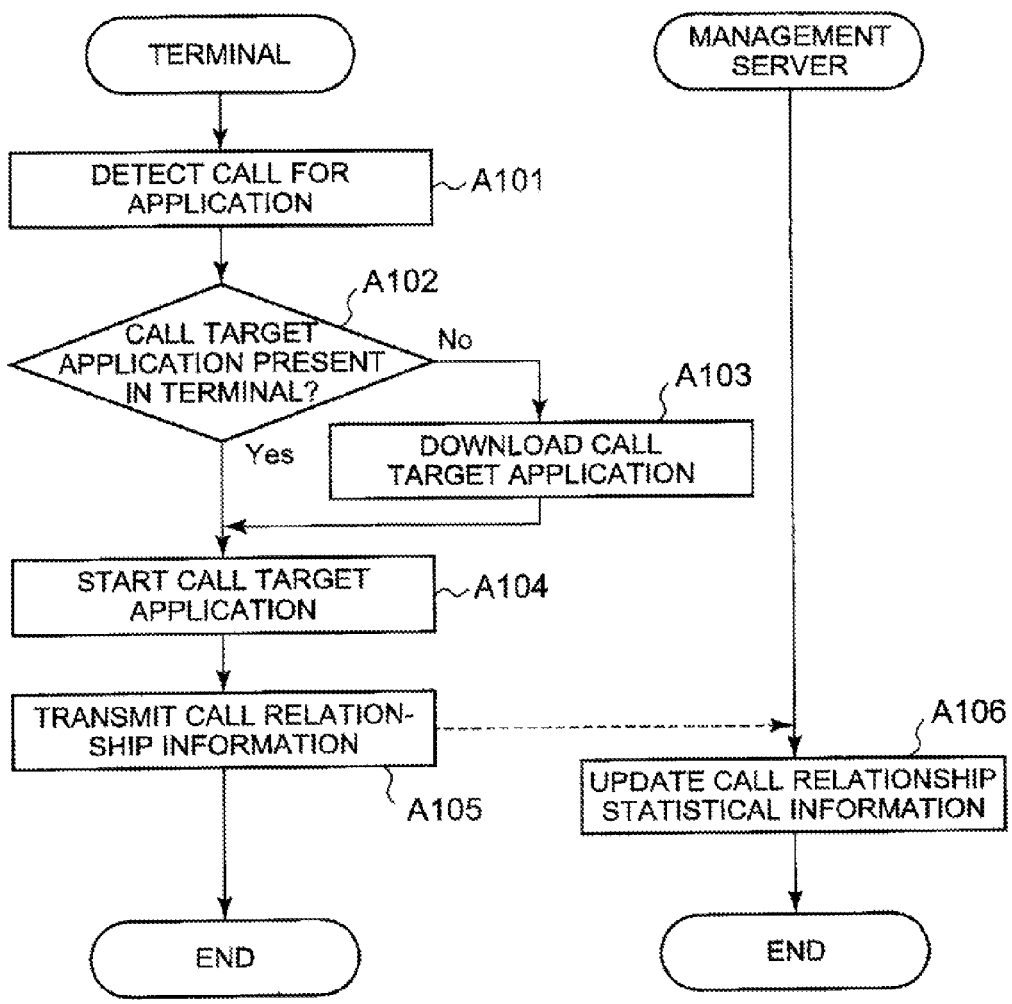

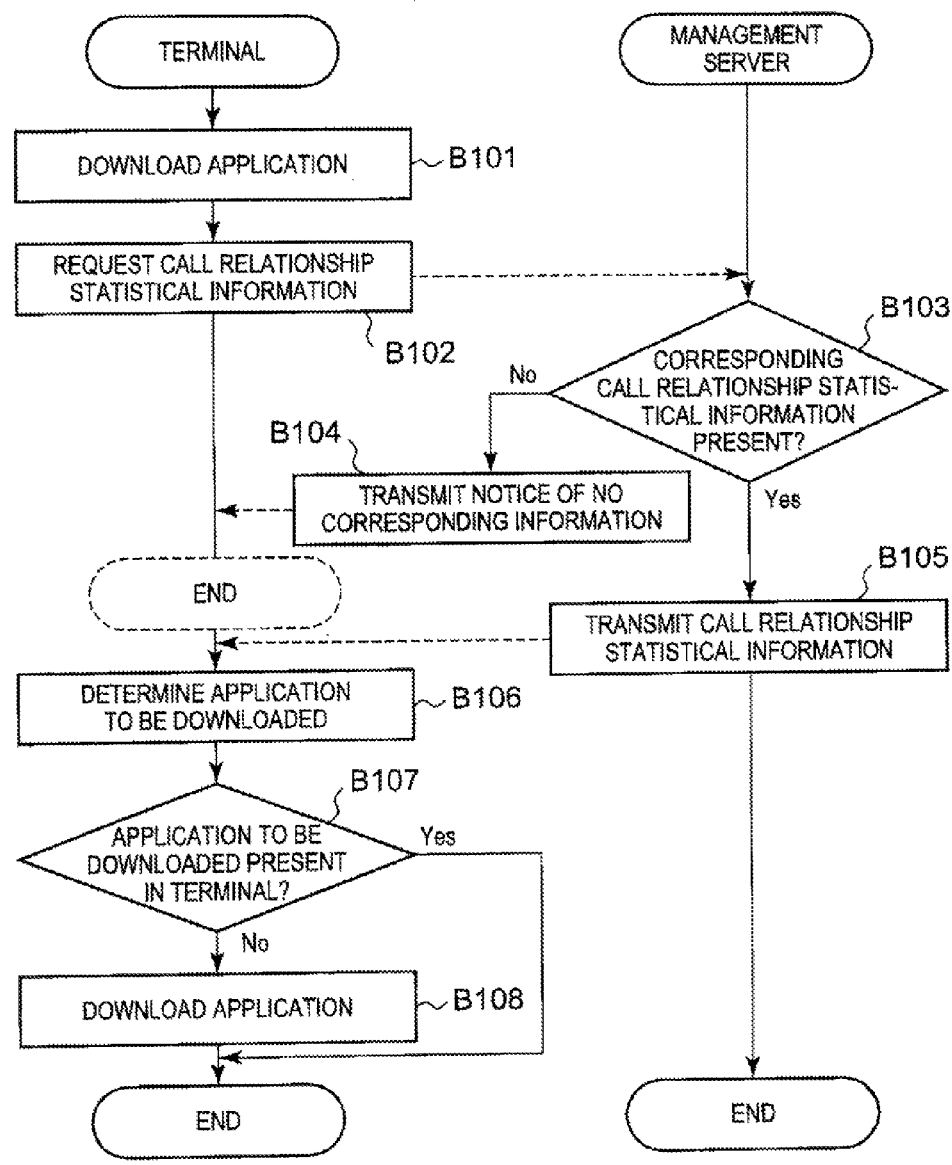

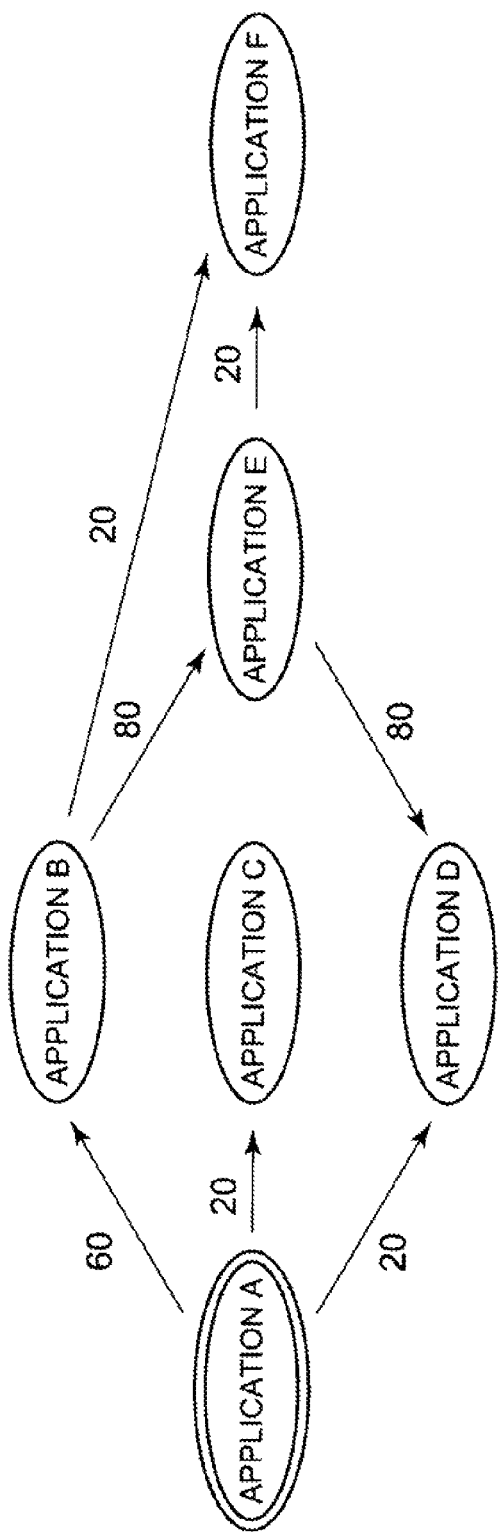

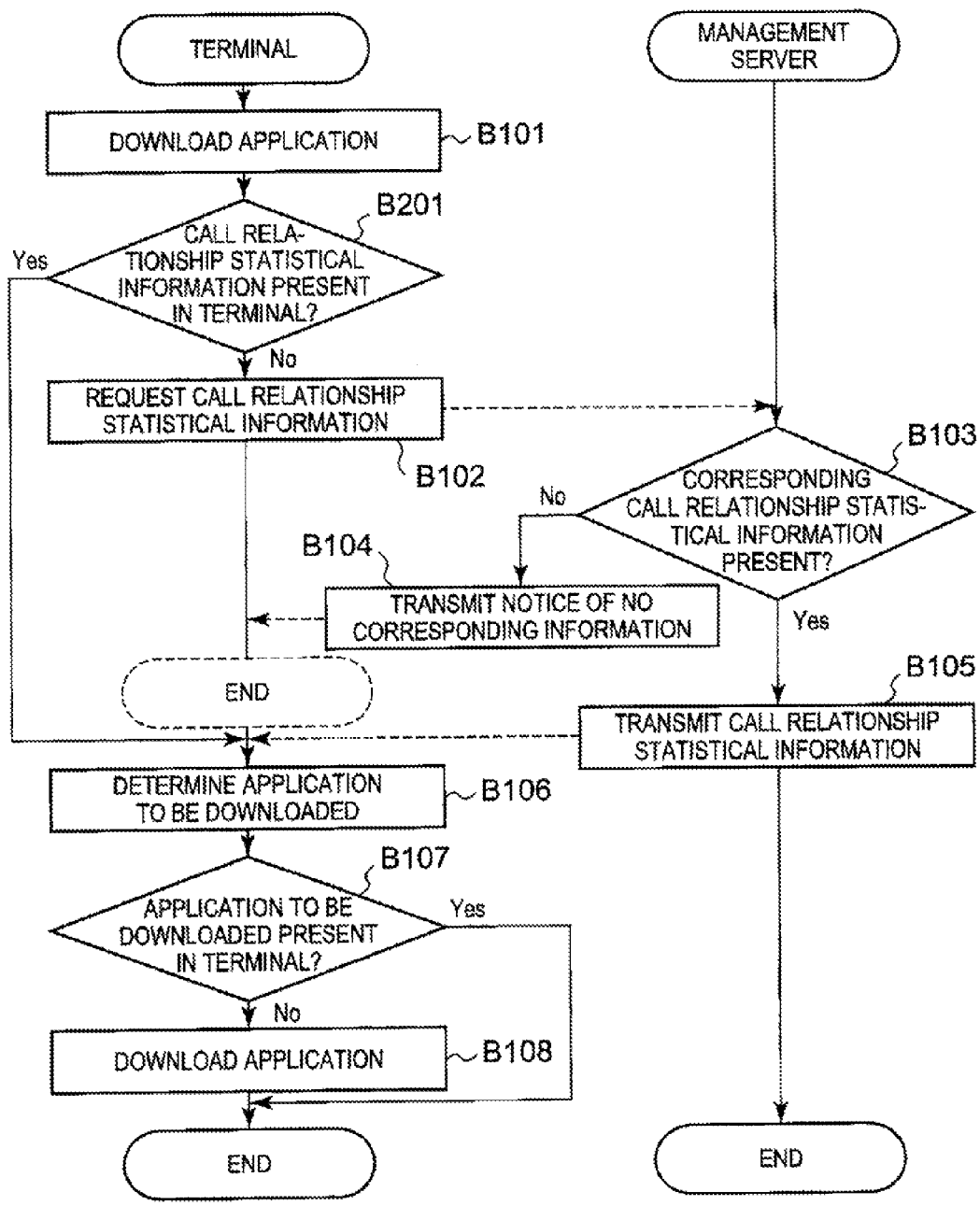

FIG. 12

| CALL SOURCE | CALL TARGET | (CALL TARGET) DL SOURCE URL | NUMBER OF CALLS |
|---|---|---|---|
| SCHEDULE APPLICATION | TRANSFER INFORMATION APPLICATION | http://foo.bar.com/norikaeApp | 6 |
| | MAP APPLICATION | http://foo.com/mapApp | 6 |
| | WEATHER APPLICATION | http://hope.com/tenkiApp | 3 |
| APPLICATION A | APPLICATION B | http://sample/bApp | 1 |
| ⋮ | ⋮ | ⋮ | ⋮ |

FIG. 13

| CALL SOURCE | CALL TARGET | (CALL TARGET) DL SOURCE URL | NUMBER OF CALLS |
|---|---|---|---|
| SCHEDULE APPLICATION | TRANSFER INFORMATION APPLICATION | http://foo.bar.com/norikaeApp | 6 |
| | MAP APPLICATION | http://foo.com/mapApp | 6 |
| | WEATHER APPLICATION | http://hope.com/tenkiApp | 3 |

DOWNLOAD SYSTEM, INFORMATION PROCESSING TERMINAL, MANAGEMENT DEVICE, AND METHOD AND PROGRAM USED THEREFOR

This application is the National Phase of PCT/JP2009/006838, filed Dec. 14, 2009, which claims the right of priority based on Japanese Patent Application No. 2008-333276, filed on Dec. 26, 2008, which is herein incorporated in its entirety by reference.

TECHNICAL FIELD

The present invention relates to a download system, an information processing terminal, a management device, a download method, and a download program, which are used for an environment in which a terminal downloads and executes an application or content data.

BACKGROUND ART

In recent years, there is increased a case where a portable information communication terminal, such as a cellular phone, a smartphone, or a PDA (personal digital assistant), downloads and installs an application via radio waves or via a personal computer (PC). For example, there is a Java® application in a cellular phone. A user is able to execute a Java® application of his/her choice on a cellular phone by selecting the Java® application out of a browser or the like and downloading the application into the cellular phone.

It is expected that portable information terminals, having functions added by downloading applications in this manner, continue to increase in the future.

There are three timings for downloading an application as follows:
1. At user selection
2. At trigger detection
3. On-demand The timing "1. At user selection" is applied to a method of performing the download when a user selects the information (performing the download) from a browser or the like by a user operation. The timing "2. At trigger detection" is applied to a method of performing the download when a certain condition, such as time and place, is satisfied. The timing "3. On-demand" is applied to a method of performing the download by an application calling another application. In the present invention, the action, in which an application calls and causes another application to perform some processing, is referred to as "application interaction." If the call target application is not found in the terminal, the application is downloaded from a server on a network in some cases.

The present invention targets at the above "3. On-demand." The problems of the on-demand method include that the processing appears to stop to the user because of long download time and that, in the case of an unavailable network, the user cannot perform the download and thus cannot continue the processing. This requires a method of estimating required applications in advance to complete the download of the applications before calling.

In addition, the portable information communication terminal is limited in resource in comparison with the PC, and thus downloading all of the related applications compresses the storage space. Further, an increase in the number of applications to be downloaded or in the downloading size increases the content fee, packet fee, or other fees correspondingly. Therefore, it is necessary to download applications thought to be really required.

As documents describing a technique of extracting required or related applications, there are, for example, Patent Document 1 and Patent Document 2. The Patent Document 1 describes a method of displaying a list of frequently-called methods in a position, to which a user easily access, in making a list of method call relationships.

Moreover, Patent Document 2 describes a method of previously acquiring (prefetching) appropriate completed works (files, applications, or the like) into an appropriate application server at a thin client terminal.

CITATION LIST

Patent Literature

PTL 1: Japanese Patent Application Laid-Open No. 2005-327036
PTL 2: Japanese Patent Application Laid-Open No. 2004-094411

SUMMARY OF INVENTION

Technical Problem

In each of the above inventions, however, there is a need to make a decision based on a history and therefore required applications cannot be predicted in advance if there is no history.

For example, in Patent Document 1, the number of calls for a method is monitored by executing a program, and therefore a tendency can be estimated only after repeating the execution to some extent.

Moreover, also in Patent Document 2, a pattern is calculated by using information such as an access history to predict required data, and therefore it is necessary to accumulate information to be predictors.

Therefore, it is an object of the present invention to provide a download system, an information processing terminal, a management device, a download method, and a download program capable of estimating applications, which are likely to be used, in advance and downloading the applications.

Solution to Problem

According to an aspect of the invention, there is provided a download system including: two or more terminals, which download and execute an application or content data; and a management device, which is connected so as to be able to communicate with each of the terminals, wherein: the terminal includes: a call relationship transmission means for transmitting call relationship information, which indicates a call relationship regarding the application or content data executed in the terminal, to the management device; and a download means for downloading the application or content data; the management device includes: a call relationship statistic holding means for holding call relationship statistical information, which indicates the statistic of the call relationship regarding the application or content data indicated by the call relationship information received from each terminal; and the download means downloads the application or content data on the basis of the call relationship statistical information held in the call relationship statistic holding means.

Further, according to another aspect of the present invention, there is provided an information processing terminal for downloading and executing an application or content data, the terminal including: a call relationship transmission means for transmitting call relationship information, which indicates a call relationship regarding the application or content data executed in the terminal to a predetermined management device, which is connected so as to be able to communicate with two or more terminals including at least the terminal and includes a call relationship statistic holding means for holding call relationship statistical information, which indicates the statistic of the call relationship regarding the application or content data indicated by the call relationship information received from each terminal; and a download means for downloading the application or content data on the basis of the call relationship statistical information held in the call relationship statistic holding means.

Further, according to still another aspect of the present invention, there is provided a management device connected so as to be able to communicate with two or more terminals, which download and execute an application or content data, the management device including: a call relationship statistic holding means for holding call relationship statistical information, which indicates the statistic of the call relationship regarding the application or content data indicated by the call relationship information received from each terminal; and a call relationship statistic transmission means for transmitting at least a part of the call relationship statistical information held in the call relationship statistic holding means to the terminal on the basis of a request from the terminal.

Further, according to still another aspect of the present invention, there is provided a download method in which a terminal downloads an application or content data, the method including the steps in which: two or more terminals transmit call relationship information, which indicates a call relationship regarding the application or content data executed in the terminal, to a management device; the management device updates and holds call relationship statistical information, which indicates the statistic of the call relationship regarding the application or content data indicated by the call relationship information received from each of the terminals; and the terminal downloads the application or content data on the basis of the call relationship statistical information held in the management device.

Further, according to still another aspect of the present invention, there is provided a download program used for an information processing terminal, which downloads and executes an application or content data, the program causing a computer to perform: processing of transmitting call relationship information, which indicates a call relationship regarding the application or content data executed in the terminal to a predetermined management device, which is connected so as to be able to communicate with two or more terminals including at least the terminal and includes a call relationship statistic holding means for holding call relationship statistical information, which indicates the statistic of the call relationship regarding the application or content data indicated by the call relationship information received from each terminal; and processing of downloading the application or content data on the basis of the call relationship statistical information held in the call relationship statistic holding means.

Further, according to still another aspect of the present invention, there is provided a download program used for a management device, which is connected so as to be able to communicate with two or more terminals for downloading and executing an application or content data, the program causing a computer, which has a call relationship statistic holding means for holding call relationship statistical information indicating the statistic of the call relationship regarding the application or content data indicated by the call relationship information received from each terminal, to perform processing of transmitting at least a part of the call relationship statistical information held in the call relationship statistic holding means to the terminal on the basis of a request from the terminal.

Advantageous Effects of Invention

According to the present invention, required applications are able to be estimated in advance by reference to call relationship statistical information shared in call relationship by a plurality of terminals. This enables an increase in possibility that a call target application has already been downloaded in the terminal. As a result, the application is able to be called at high speed without performing an on-demand download. Moreover, it is possible to continue processing even in an environment in which a network is unavailable.

BRIEF DESCRIPTION OF DRAWINGS

FIG. 1 It depicts a block diagram illustrating a configuration example of a download system according to a first exemplary embodiment.

FIG. 2 It depicts a flowchart illustrating an example of a processing flow of database creation processing in the first exemplary embodiment.

FIG. 3 It depicts an explanatory diagram illustrating an example of call relationship information.

FIG. 5 It depicts a flowchart illustrating an example of a processing flow of application download processing in the first exemplary embodiment.

FIG. 6 It depicts an explanatory diagram illustrating an example of call relationship statistical information related to application A.

FIG. 7 It depicts an explanatory diagram illustrating an example of a call relationship regarding an application.

FIG. 10 It depicts a flowchart illustrating an example of a processing flow of application download processing in the second exemplary embodiment.

FIG. 11 It depicts an explanatory diagram illustrating an example of call relationship information in a working example.

FIG. 12 It depicts an explanatory diagram illustrating an example of information held in a call relationship statistical information DB in the working example.

FIG. 13 It depicts an explanatory diagram illustrating an example of call relationship statistical information related to a schedule application in the working example.

DESCRIPTION OF EMBODIMENT

Exemplary Embodiment 1

Figure 4:
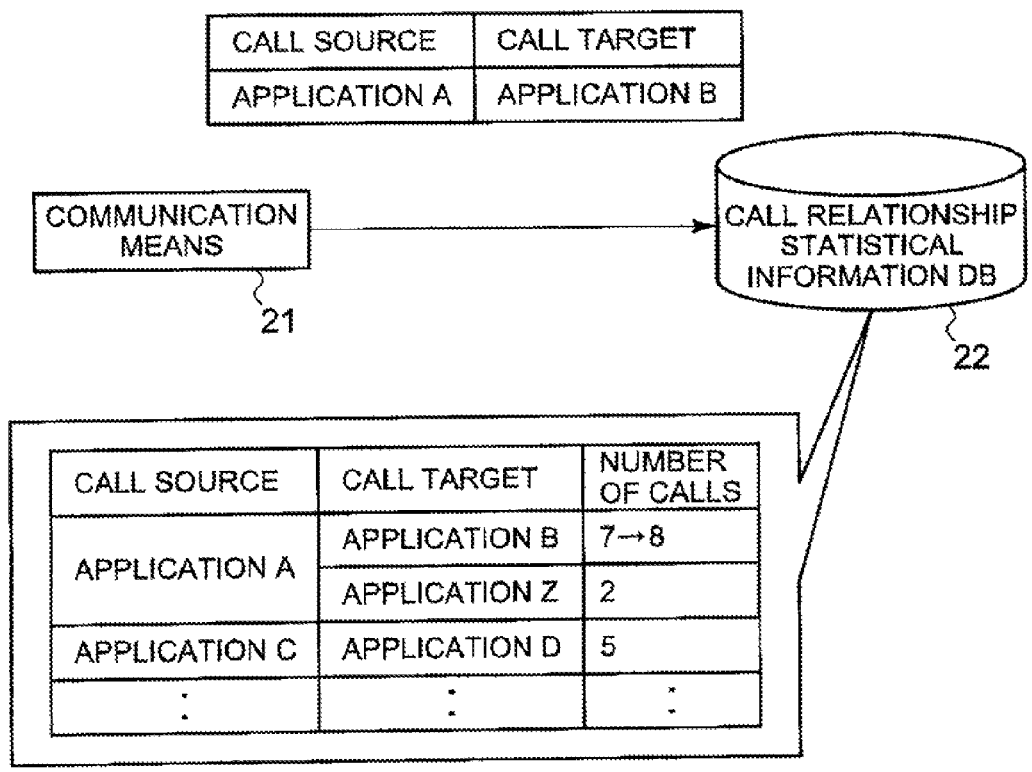
FIG. 4 It depicts an explanatory diagram illustrating an example of call relationship statistical information held in a call relationship statistical information DB 22.

Hereinafter, preferred exemplary embodiments of the present invention will be described in detail with reference to the accompanying drawings. FIG. 1 is a block diagram illustrating a configuration example of a download system according to a first exemplary embodiment of the present invention. The download system illustrated in FIG. 1 includes a terminal 1, a management server 2, and an application server 3. Although only one terminal 1 is illustrated in FIG. 1, it is assumed that there are a plurality of terminals 1. Further, only one application server 3 is also illustrated in FIG. 1, though a plurality of application servers 3 are possible.

The terminal 1 includes a communication means 11, an application control means 12, a storage device 13, and a judging means 14.

The communication means 11 is a means for communicate with the management server 2 and the application server 3 described later. In this exemplary embodiment, the communication means 11 transmits call relationship information, which indicates, for example, a call relationship regarding an application executed in the terminal 1, to the management server 2. Moreover, the communication means 11 receives call relationship statistical information, which indicates, for example, the statistic of the call relationship regarding the application indicated by the call relationship information received from each terminal. Further, the communication means 11 downloads application 31 (hereinafter, referred to as "appli 31") from the application server 3.

The application control means 12 manages a life cycle such as the start and end of the application 131 stored in the storage device 13 described later. When a running application calls another application, the application control means 12 makes a request to send the call relationship information therefor to the communication means 11.

The storage device 13 stores an application 131 (hereinafter, referred to as "appli 131"), which is executed in the terminal 1. The appli 131 includes the appli 31 downloaded from the application server 3. In addition, the storage device 13 holds information on a life cycle such as the start and end of each appli 131.

The judging means 14 judges whether to download a related application from the application server 3 on the basis of the call relationship statistical information (information received from the management server 2) passed from the communication means 11. Specifically, the judging means 14 determines an application or content data, which is to be downloaded, on the basis of the acquired call relationship statistical information.

In this exemplary embodiment, the communication means 11 is implemented by, for example, a communication device provided in the terminal 1 and the CPU, which operates according to a program. Further, the application control means 12 and the judging means 14 are implemented by the CPU, which operates according to a program, provided in the terminal 1. Moreover, the storage device 13 is implemented by a storage device provided in the terminal 1.

The management server 2 includes a communication means 21 and a call relationship statistical information database (hereinafter, referred to as "call relationship statistical information DB 22").

The communication means 21 receives the call relationship information from the terminal 1 and updates the call relationship statistical information DB 22. Further, the communication means 21 transmits information (call relationship statistical information) in the call relationship statistical information DB to the terminal 1 on the basis of a request from the terminal 1.

The call relationship statistical information DB 22 is a database system, which holds call relationship statistical information for applications obtained from call relationship statistical information received from the respective terminals.

In this exemplary embodiment, the communication means 21 is implemented by a communication device provided in the management server 2 and the CPU, which operates according to a program. Further, the call relationship statistical information DB 22 is implemented by a database system provided in the management server 2. The database system includes a storage device and a controller, which constructs information stored in the storage device as a database and performs access control.

The application server 3 is a server device that manages the application 31 (appli 31). The application server 3 transmits a specified appli 31 on the basis of a download request received from the terminal 1.

Subsequently, the operation of this exemplary embodiment will be described. The entire download system of this exemplary embodiment is largely classified into two groups: 1) database creation processing; and 2) application download processing. Hereinafter, each processing will be described with reference to a flowchart.

First, database creation processing will be described with reference to a flowchart illustrated in FIG. 2. FIG. 2 is a flowchart illustrating an example of a processing flow of database creation processing in this exemplary embodiment. In the example illustrated in FIG. 2, it is assumed that an application running in the terminal 1 (referred to as "application A," here) calls another application (referred to as "application B," here). The application control means 12 detects this call (step A101) and searches for the application B, which is a called application, stored in the storage device 13 (step A102). Unless the application B is stored in the storage device 13, the application control means 12 downloads the application B from the application server 3 (NO in step A102, step A103). If the application B has already been stored there (YES in step A102) or if the download is completed, the application control means 12 starts the application B (step A104).

Subsequently, the application control means 12 performs processing for notifying the management server 2 of the call relationship information indicating the detected call relationship. In this specification, the application control means 12 makes a transmission request to the communication means 11 to send data, including call relationship information indicating that the application A calls the application B, to the management server 2. FIG. 3 is an explanatory diagram illustrating an example of call relationship information. As illustrated in FIG. 3, the call relationship information may include, for example, identifiers such as IDs enabling the identifications of a call source application and a call target application. The identifier of the application may be, for example, a download source URL. In the present invention, an application name is used to indicate the identifier for easy understanding. The communication means 11 transmits the sent data including the received call relationship information to the management server 2 (step A105).

The communication means 21 in the management server 2 updates the call relationship statistical information DB 22 on the basis of the received information (step A106). FIG. 4 is an explanatory diagram illustrating an example of call relationship statistical information held in the call relationship statistical information DB 22. As illustrated in FIG. 4, the call relationship statistical information may include, for example, identifiers for identifying a call source application and a call target application and the number of calls. In step A106, for example, the number of calls for the application B is incremented by one regarding the information on the application A in the call relationship statistical information DB 22.

The above is an example of a processing flow of the database creation processing in this exemplary embodiment. The information accumulated in the call relationship statistical information DB 22 in the management server 2 includes information received from all terminals, which are not illustrated, connectable to the management server 2, as well as from the terminal 1. Therefore, statistical information having been used by all users is accumulated, instead of information having been used by only an arbitrary user.

Subsequently, application download processing will be described with reference to the flowchart illustrated in FIG. 5. FIG. 5 is a flowchart illustrating an example of a processing flow of the application download processing in this exemplary embodiment. It is assumed that the user of the terminal 1 selects the application A from a browser or the like, which is not illustrated, and downloads the application A from the application server 3 (step B101). In this situation, the communication means 11 requests the call relationship statistical information related to the application (the application A, here) to be downloaded from the management server 2 (step B102). At this time, the communication means 11 transmits a call relationship statistical information acquisition request including the ID of the application A.

Upon receiving the call relationship statistical information acquisition request, the management server 2 searches the call relationship statistical information DB on the basis of the ID of the requested application A. If the corresponding call relationship statistical information is present (YES in step B103), the management server 2 transmits the information to the terminal 1 (step B105). Here, the term "corresponding call relationship statistical information" means call relationship statistical information related to the requested application such as, for example, call relationship statistical information including the information on the requested application in a first call source. An example of the transmitted call relationship statistical information is illustrated in FIG. 6. As illustrated in FIG. 6, the management server 2 transmits, for example, call relationship statistical information including the application A in the call source. In FIG. 6, the statistic shows, for example, the number of calls from the application A to the application B to be eight. Further, the statistic shows, for example, the number of calls from the application A to the application Z to be two. Note that the information to be sent may include call relationship statistical information acquired as a result of a search by following several call relationships, such that the information includes not only the call relationship statistical information with the requested application A as a call source, but also call relationship statistical information with a call target application of the application A as a call source.

Unless the corresponding call relationship statistical information is present, response data including the notice (no corresponding data) may be transmitted to the terminal 1 (step B104).

The communication means 11 of the terminal 1 receives the call relationship statistical information or the response data of no corresponding data from the management server 2, and thereupon passes it to the judging means 14. If the corresponding data is present, the judging means 14 determines the application to be downloaded on the basis of the received call relationship statistical information (step B106). Although this determination method is not particularly defined in the present invention, the determination may be made, for example, with judgment based on the number of applications such as the top several applications to be downloaded or with judgment based on the number of calls. In this specification, the download condition is assumed to be "30 percent or more as the percent of the number of calls." Referring to FIG. 6, it is understood that the application satisfying the download condition is the application B (the percent of the number of calls=8/10=80 percent). Therefore, the application B is determined to be downloaded. If the communication means 11 receives the response data of no corresponding data, it is considered that there is no application to be downloaded in advance and the processing ends directly.

Subsequently, the judging means 14 searches for an application, which is determined to be downloaded, in the terminal 1 (step B107). If the application is not found, the communication means 11 downloads the application from the application server 3 (NO in step B107, step B108). If the application has already been present (YES in step B107), there is no need to perform any operation for the application.

Here, the determination processing for the application to be downloaded in step B106 of FIG. 5 will be described in more details. The call relationship statistical information might not be stored in a simple tree structure as shown in the above. For example, the application A might call the application B or call an application D. Further, after the application A calls the application B, the application B might call an application E and further the application E might call the application D. In the light of this, the structure is as illustrated in FIG. 7. FIG. 7 is an explanatory diagram illustrating an example of a call relationship regarding an application. Each of the arrows in FIG. 7 Indicates a call relationship (a call from the base of the arrow to the tip thereof), and the numeral value along the arrow indicates the percent of the number of calls. In the download target application determination processing in this structure of call relationships, a result of the calculation method as illustrated in the lower part of FIG. 7 may be used as information for judgment.

For example, the example illustrated in FIG. 7 shows 0.6 as the rate of the number of calls from the application A as a base point to the application B. Further, for example, 0.2 is shown as the rate of the number of calls from the application A as a base point to the application C. Still further, for example, 0.584 is shown as the total rate of the number of calls from the application A as a base point to the application D obtained by adding 0.6 as the rate of the number of calls from the application A to the application D to 0.384 as the rate of the number of calls on the route starting from the application A and following subsequent applications, such as application A→application B→application E→application D.

In this case, if the above condition "30 percent or more as the percent of the number of calls" is applied, it is judged that "the application B, the application D, and the application E are downloaded together with the application A" when the application A is downloaded.

The above is an example of the processing flow of the application download processing according to this exemplary embodiment. It is possible to estimate and download related applications by reference to the information in the call relationship statistical information DB 22.

According to this exemplary embodiment, a database is constructed by absorbing call relationship information on the application from the previous terminals, which are connectable to the management server 2 and then the constructed database is shared. Therefore, even if the application is downloaded for the first time in a terminal, a user is able to know the information on applications related to the application downloaded for the first time by referencing the call relationship statistical information in the database constructed on the management server. Specifically, applications likely to be called in the near future are able to be estimated in advance and downloaded into the terminal, and therefore any of the applications is able to be called at high speed without downloading when the application is called for execution.

Moreover, even if a network is unavailable at the time of calling the application, related applications have already been stored in the terminal and therefore the user is able to continue the processing (within a range of the applications in the terminal).

Exemplary Embodiment 2

Figure 8:
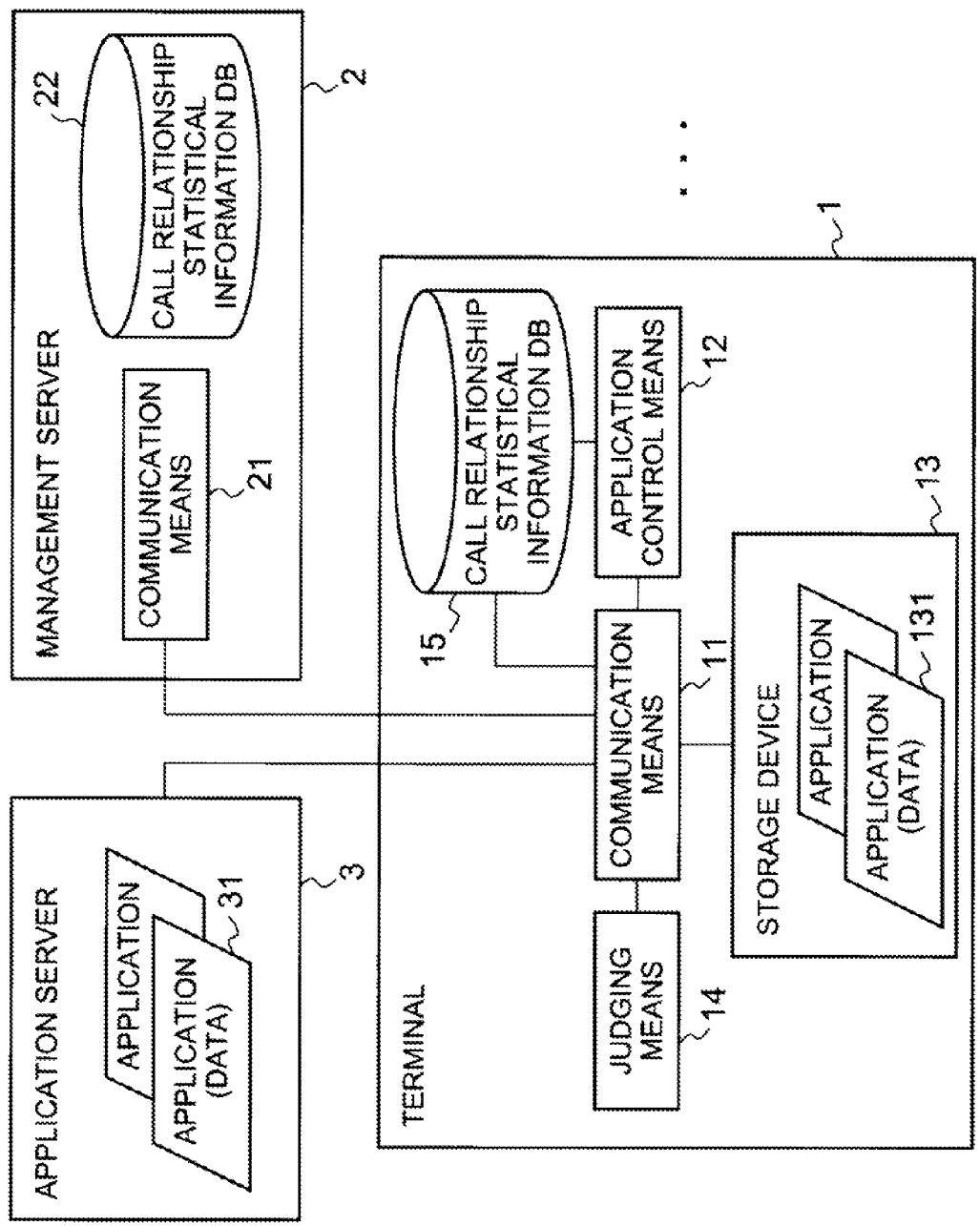
FIG. 8 It depicts a block diagram illustrating a configuration example of a download system according to a second exemplary embodiment.

Subsequently, a second exemplary embodiment of the present invention will be described below. FIG. 8 is a block diagram illustrating a configuration example of a download system according to the second exemplary embodiment. As illustrated in FIG. 8, the download system according to this exemplary embodiment differs from the first exemplary embodiment illustrated in FIG. 1 in that the terminal 1 includes a call relationship statistical information database 15 (hereinafter, referred to as "call relationship statistical information DB 15").

The call relationship statistical information DB 15 stores information indicating the statistic of the call relationship regarding the application in the terminal 1 (intra-terminal call relationship statistical information).

Figure 9:
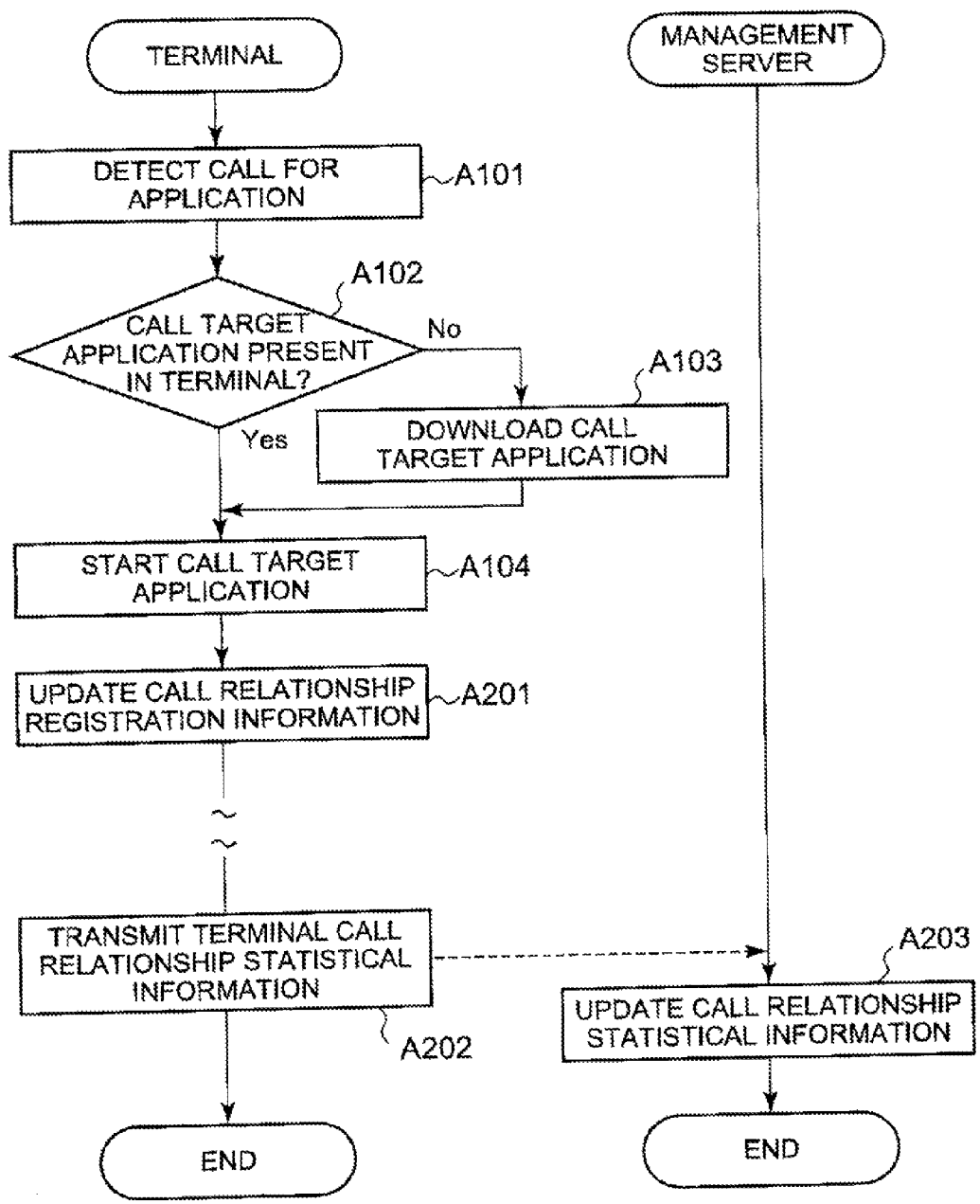
FIG. 9 It depicts a flowchart illustrating an example of a processing flow of database creation processing in the second exemplary embodiment.

Subsequently, the operation of this exemplary embodiment will be described below. First, database processing in this exemplary embodiment will be described with reference to the flowchart in FIG. 9. While the management server 2 is notified of the call relationship information for each call for an application as shown in steps A104 to A105 of FIG. 2 in the first exemplary embodiment, the call relationship statistical information DB 15 in the terminal 1 is updated in step A201 of FIG. 9 in advance in this exemplary embodiment, instead of transmitting the call relationship information for each call. Then, the management server 2 is notified of the information in the call relationship statistical information DB 15 (intra-terminal call relationship statistical information) at a predetermined timing (step A202).

Although the timing of notifying the management server 2 is not particularly defined, for example, there is conceivable a method of transmitting the information collectively at the end of the running application or a method of transmitting the information at regular time intervals. Other operations are the same as those of the first exemplary embodiment and therefore the description thereof is omitted here.

Subsequently, application download processing in this exemplary embodiment will be described with reference to the flowchart of FIG. 10. FIG. 10 is a flowchart illustrating an example of a processing flow of the application download processing in this exemplary embodiment.

In the first exemplary embodiment, the call relationship statistical information related to the application has been requested from the management server 2 when the application is downloaded as shown in steps B101 to B102 of FIG. 5. In this exemplary embodiment, however, in step B201 of FIG. 10, the call relationship statistical information DB 15 in the terminal 1 is searched for the call relationship statistical information (intra-terminal call relationship statistical information) related to the downloaded application. If there is the corresponding call relationship statistical information in the terminal 1 (YES in step B201), the related application is determined on the basis of the call relationship statistical information (step B106). In this exemplary embodiment, the case where there is the corresponding call relationship statistical information may occur in a situation where the downloaded application has been present in the terminal and called before, though the application was deleted for some reason.

If there is no corresponding call relationship statistical information in the terminal 1 (NO in step B201), the call relationship statistical information may be requested from the management server 2 (step B102) in the same manner as in the first exemplary embodiment. Other operations are the same as those of the first exemplary embodiment and therefore the description thereof is omitted here.

As described hereinabove, in this exemplary embodiment, the provision of the call relationship statistical information DB 15 in the terminal eliminates the need for notifying the management server 2 every time an application is called, thereby enabling a reduction in the cost (processing time, communications traffic, etc.). Further, the determination of a related application based on the call relationship statistical information in the call relationship statistical information DB 15 in the terminal means the determination based on the information only in the terminal, thus enabling an increase in the accuracy in comparison with the determination based on the information held in the management server 2. In other words, it is possible to estimate applications more likely to be called at the terminal.

While the management server 2 and the application server 3 are described as server devices different from each other in the first and second exemplary embodiments, the management server 2 and the application server 3 may be implemented by a single server device.

Moreover, while the range of sharing the call relationship statistical information DB 22 of the management server 2 is not particularly defined in the first and second exemplary embodiments, for example, there is conceivable a method of sharing the call relationship statistical information DB 22 in each telecommunications carrier or each company or only within a range of a specific group of friends or the like. Thereby, the pattern of using the application is more limited, and therefore it is also possible to increase the accuracy of the determination of the application to be downloaded by narrowing the range of sharing for each use.

While there has been shown an example in which all of the information transmitted from the terminal 1 is reflected on the management server 2 in the first and second exemplary embodiments, it is also possible to limit the information, for example, by making a condition that "the notification of the call relationship information on the same application is valid only once for one terminal." Thereby, for example, in the case where a malicious user wants to download the application B into another terminal on purpose, it is possible to prevent the call relationship statistical information in the management server 2 from being manipulated indirectly by increasing cases of calling the application B at the terminal. For this, for example, when the terminal 1 notifies the management server 2 of the call relationship information, the terminal ID is also transmitted, so that the management server 2 controls the received information by using the terminal ID.

Further, the first and second exemplary embodiments show the examples in which, when an application is downloaded, applications related to the application are automatically downloaded, but the operation is not limited thereto. For example, the communication means 11 may confirm with the user whether to perform download by displaying information on a download candidate application on the screen of the display device provided in the terminal 1 without automatically downloading the related applications. In this operation, it is also possible to display fees such as a packet fee or an application fee for download and the data size. Further, instead of confirming with the user every time, a setting screen or the like may be provided with setting items to determine whether to automatically download the related applications, so that the operation is selected according to the setting state.

Moreover, the timing of downloading the related applications is not limited to the timing of downloading the call source application therefor. For example, it is also possible to start processing for downloading applications related to an application at the time of starting the application. Further, the related applications may be downloaded when the processing load in the terminal 1 is low or when a network resource is sufficiently available after the end of download or after the startup. In this case, the terminal 1 may be provided inside with a means for monitoring the processing state of the terminal or a network situation to check whether there is an application awaiting download when receiving notification from the monitoring means.

Although the first and second exemplary embodiments show the information composed of a call source, a call target, and the number of calls as an example of call relationship statistical information, the call relationship statistical information may further include an application size, a download source URL, or other information.

Although the first and second exemplary embodiments limit the download target to an application, the download target is not limited thereto. Specifically, the present invention is applicable also to data such as image data and sound data, an HTML file, and other documents. For example, it is possible to perform processing of previously downloading image data likely to be used by an application.

Further, the first and second exemplary embodiments show the examples of downloading related applications under the condition of "30 percent or more as the percent of the number of calls," but the present invention is not limited thereto. For example, the determination may be made with consideration for the size of a download target, the current terminal load, a network situation, or the like. The terminal load and the network situation may be acquired by using, for example, the monitoring means.

Further, the first and second exemplary embodiments show examples that the judging means 14 is present in the terminal 1, but the present invention is not limited thereto. For example, the judging means 14 may be present in the management server 2. In this case, the terminal 1 requests the information on a download candidate application, instead of issuing a call relationship statistical information request, and the judgment means in the management server 2 searches for the corresponding call relationship statistical information from a specified call source application and determines and gives notice of the related applications. The configuration may be made without the judgment means, which determines related applications on the basis of the corresponding call relationship statistical information. In this configuration, all applications included in the corresponding call relationship statistical information are downloaded. Note that, however, applications unlikely to be called are also downloaded and therefore desirably one of the terminal 1 and the management server 2 includes the determination means.

Moreover, the first and second exemplary embodiments show examples that the call relationship statistical information is always accumulated, but the present invention is not limited thereto. For example, it is possible to provide a control for resetting the call relationship statistical information at certain intervals. This enables the determination of an application to be downloaded on the basis of a tendency in a limited period.

Further, the second exemplary embodiment shows an example that only the call relationship statistical information DB 15 of the terminal 1 stores only the information in the terminal 1, but the call relationship statistical information DB 15 may also hold, for example, information read from the call relationship statistical information DB 22 of the management server 2. In this instance, when there is no corresponding information in the call relationship statistical information DB 15, there is no need to request the information from the management server 2 each time, thereby increasing the possibility of a cost reduction. Note that it is desirable to always keep the information in the call relationship statistical information DB 15 up to date by synchronizing the information at certain intervals or the like.

Subsequently, the operation of the first exemplary embodiment according to the present invention will be described by using a specific working example. This working example will be described by way of example of an application interaction function in a cellular phone. In this working example, the terminal 1 is a cellular phone. Further, the management server 2 is a server device of a telecommunications carrier. The application server 3 is a server device of a content provider.

The following describes a processing flow of database creation processing and application download processing. First, the database creation processing will be described. At present, a schedule application (hereinafter, referred to as "schedule appli") is running in the cellular phone A. Here, it is assumed that the transfer information application (hereinafter, referred to as "transfer information appli") is called from the running schedule appli. The application control means 12 of the cellular phone A detects a call for the transfer information application and checks that the transfer information application is stored in the storage device 13. In this specification, it is assumed that the transfer information application has been downloaded before and now is stored in the storage device 13 of the cellular phone A.

The application control means 12 of the cellular phone A starts the transfer information application and then transmits the call relationship information, which indicates that the schedule application calls the transfer information appli, to the server of the telecommunications carrier via the communication means 11. FIG. 11 is an explanatory diagram illustrating an example of call relationship information to be transmitted. As illustrated in FIG. 11, the call relationship information includes information on a call source application, information on a call target application, and the download source URL of the call target application.

The communication means 21 of the telecommunications carrier server updates the call relationship statistical information DB 22 on the basis of the received information. The mechanism of the update processing is as described above. FIG. 12 illustrates an example of information held in the call relationship statistical information DB 22 after the update processing. FIG. 12 shows, for example, that the number of calls from the schedule application to the transfer information application is six in the statistic and the download source URL of the call target application is "http://foo.bar.com/horikaeApp." Moreover, FIG. 12 shows that the applications called from the schedule application include a map application (the number of calls=6) and a weather application (the number of calls=3) in addition to the transfer information appli. Further, FIG. 12 shows, for example, that the number of calls from the application A to the application B is one in the statistic and the download source URL of the call target application is http://sample/bApp.

Subsequently, the application download processing will be described. This working example is described by using an example that the application download processing is performed in a cellular phone B. It is assumed that the cellular phone A performs the database creation processing while the cellular phone B selects the schedule application from a browser or the like by a user operation and performs download from the server of the content provider. In this operation, the communication means 11 of the cellular phone B requests the call relationship statistical information related to the schedule application from the telecommunications carrier server. In this specification, the communication means 11 transmits a call relationship statistical information request with the application name specified as the ID of the schedule appli.

The telecommunications carrier server searches the call relationship statistical information DB 22 on the basis of the ID of the requested schedule appli. Here, the cellular phone A updated the call relationship statistical information in the call relationship statistical information DB 22. Therefore, the server acquires the corresponding call relationship statistical information (the call relationship statistical information related to the schedule appli) and transmits the information to the cellular phone B, which is a request source. FIG. 13 illustrates an example of the call relationship statistical information transmitted to the cellular phone B. In the example illustrated in FIG. 13, three records with a transfer information appli, a map appli, and a weather application as call targets are illustrated as call relationship statistical information with the call source application as a schedule appli. In addition to the information on the call target application, each record includes the download source URL of the call target application and the number of calls. The number of calls for the call target application for each is as described in the example of FIG. 12.

The cellular phone B receives the call relationship statistical information as a response to the request, and thereupon the judging means 14 judges whether to determine the application related to the schedule appli, which is a call source, to be a download target on the basis of the received call relationship statistical information. This judging method (the method of determining the downloaded application) is as has been already described. Also in this working example, the download condition is assumed to be "30 percent or more as the percent of the number of calls." According to the example illustrated in FIG. 13, the following two applications satisfy the condition: the transfer information application with the percent of the number of calls=6/15=40 percent; and the map application with the percent of the number of calls=6/15=40 percent. Therefore, the judging means 14 determines these two applications to be download targets. Upon the determination of the target applications, the cellular phone B downloads the applications from the server of the content provider with reference to the URLs from which the applications are downloaded.

As described hereinabove, in this working example, the telecommunications carrier server manages the call relationships regarding an application in the cellular phone A (or a number of other cellular phones) for sharing, thereby enabling related applications (for example, an application likely to be started next) to be estimated and downloaded in advance also in the cellular phone B having not executed the application before.

Figure 14:
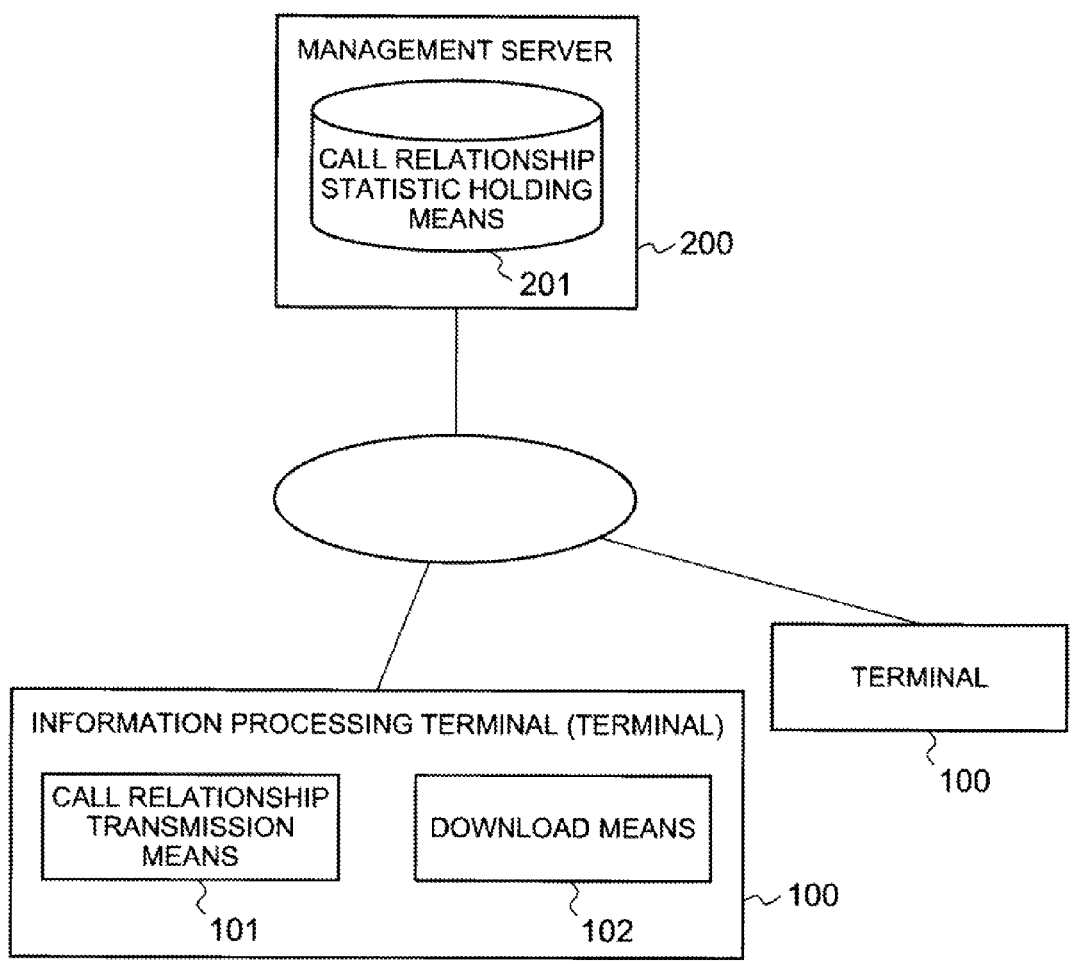
FIG. 14 It depicts an explanatory diagram illustrating the outline of the present invention.

Subsequently, the outline of the present invention will be described. FIG. 14 is a block diagram illustrating the outline of the present invention. The download system according to the present invention includes two or more terminals 100 and a management device 200. Further, the terminal 100 includes a call relationship transmission means 101 and a download means 102. Further, the management device 200 includes a call relationship statistic holding means 201.

The call relationship transmission means 101 (for example, the communication means 11 and the application control means 12) transmits call relationship information, which indicates a call relationship regarding the application or content data executed in the terminal 100, to the management device 200.

The download means 102 (for example, the communication means 11) downloads the application or content data. In the present invention, the download means 102 downloads the application or content data on the basis of the call relationship statistical information held in the call relationship statistic holding means 201. The download means 102 may download the application or content data on the basis of the statistic of the call relationship that the specified application or content data is a first call source, for example, which is indicated by the call relationship statistical information.

The call relationship statistic holding means 201 (for example, the call relationship statistical information DB 22) holds call relationship statistical information, which indicates the statistic of the call relationship regarding the application or content data indicated by the call relationship information received from each terminal 100.

Figure 15:
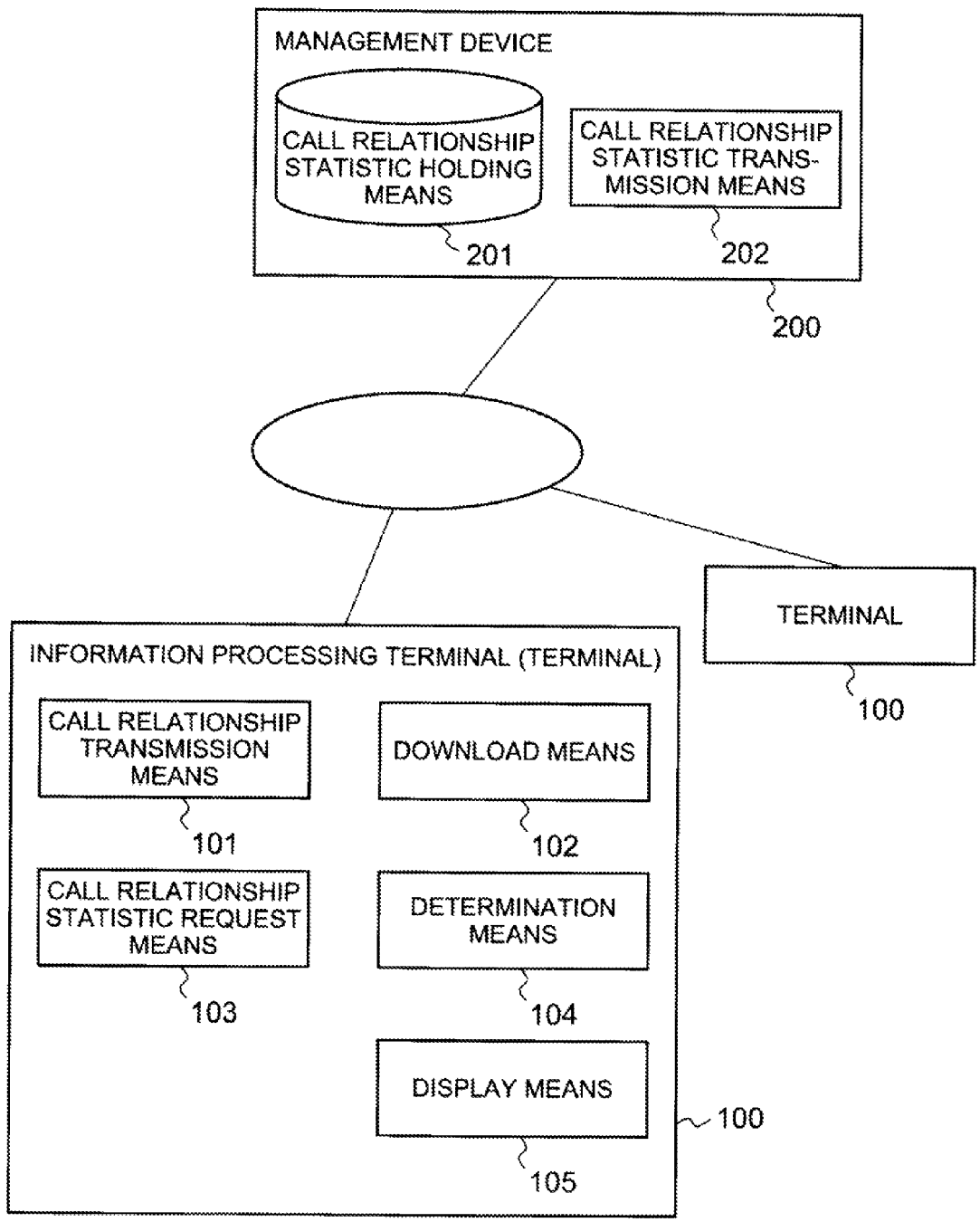
FIG. 15 It depicts a block diagram illustrating a configuration example of a download system according to the present invention.

Further, FIG. 15 is a block diagram illustrating another configuration example of the download system according to the present invention. The download system according to the present invention may have the configuration illustrated in FIG. 15, for example. Specifically, relative to the configuration illustrated in FIG. 14, the terminal 100 may further include a call relationship statistic request means 103 and a determination means 104 and the management device 200 may further include a call relationship statistic transmission means 202. Moreover, the terminal 100 may further include a display means 105.

The call relationship statistic request means 103 (for example, the communication means 11 and the application control means 12) requests call relationship statistical information from the management device 200.

The determination means 104 (for example, judging means 14) determines an application or content data to be downloaded, on the basis of the acquired call relationship statistical information. The determination means 104 may determine a call target application or content data having the percent of the number of calls equal to or more than a certain threshold value in the statistic of the call relationship that the specified application or content data is the first call source, for example, which is indicated by the call relationship statistical information, as an application or content data to be downloaded.

The display means 105 (for example, the communication means 11 and the display device) displays the information on the application to be downloaded.

The call relationship statistic transmission means 202 (for example, the communication means 21) transmits at least a part of the call relationship statistical information, which is held in the call relationship statistic holding means, on the basis of the request from the terminal 100 to the terminal 100, which is a request source.

Figure 16:
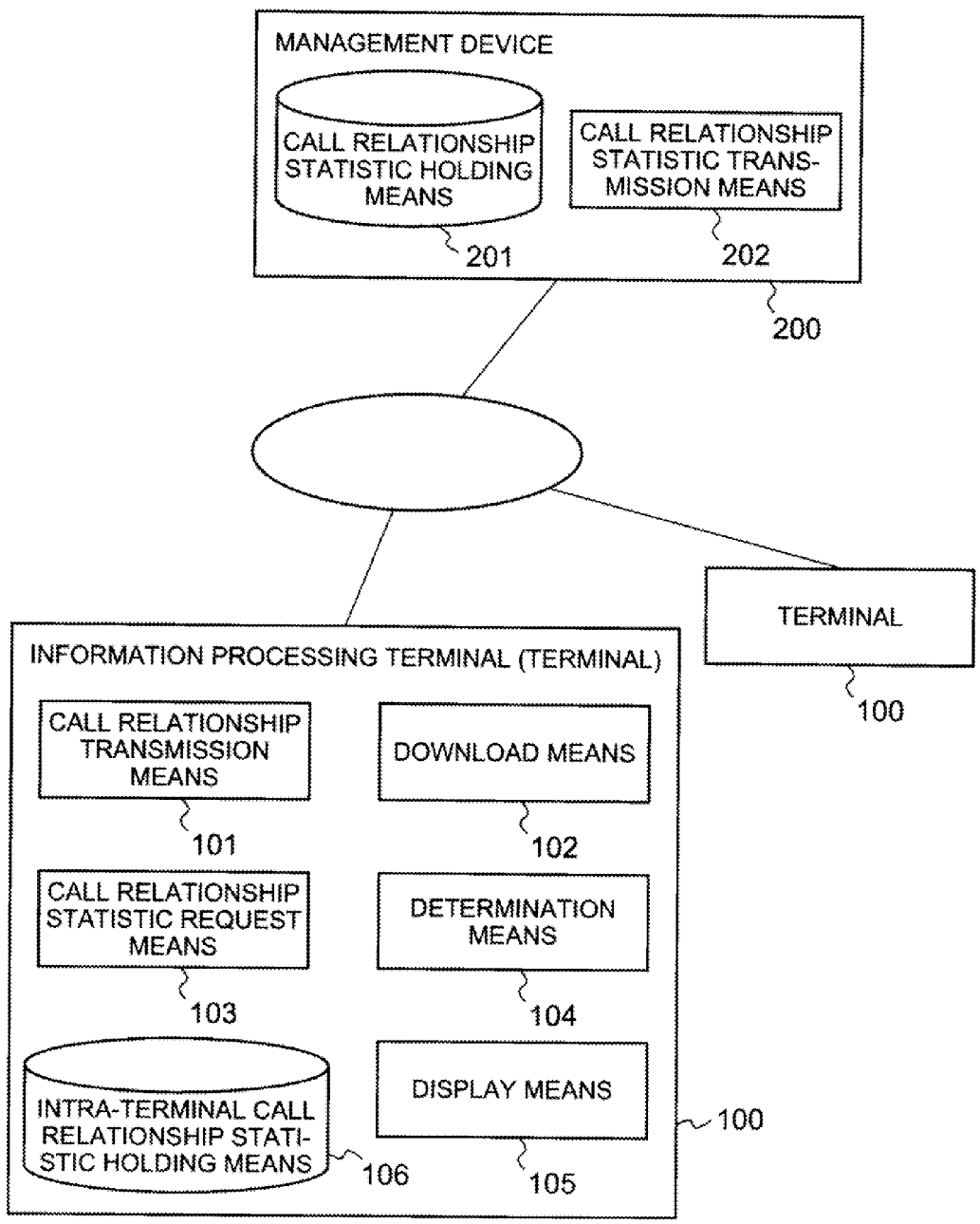
FIG. 16 It depicts a block diagram illustrating another configuration example of the download system according to the present invention.

FIG. 16 is a block diagram illustrating another configuration example of the download system according to the present invention. The download system according to the present invention may have a configuration, for example, as illustrated in FIG. 16. Specifically, relative to the configuration illustrated in FIG. 15, the terminal 100 may further include an intra-terminal call relationship statistic holding means 106.

The intra-terminal call relationship statistic holding means 106 (for example, the call relationship statistical information DB 15) holds call relationship statistical information including at least the statistic of the application or content data executed in the terminal 100. In this instance, the call relationship information request means 103 may request the call relationship statistical information from the management device 200 when the intra-terminal call relationship statistic holding means 106 does not have the call relationship statistical information indicating the statistic of the call relationship in which the specified application or content data is the first call source.

The determination means 104 may determine the application or content data to be downloaded on the basis of the call relationship statistical information held in the intra-terminal call relationship statistic holding means 106 or the call relationship statistical information acquired from the management device 200 as a result of the request by the call relationship information request means 103.

Figure 17:
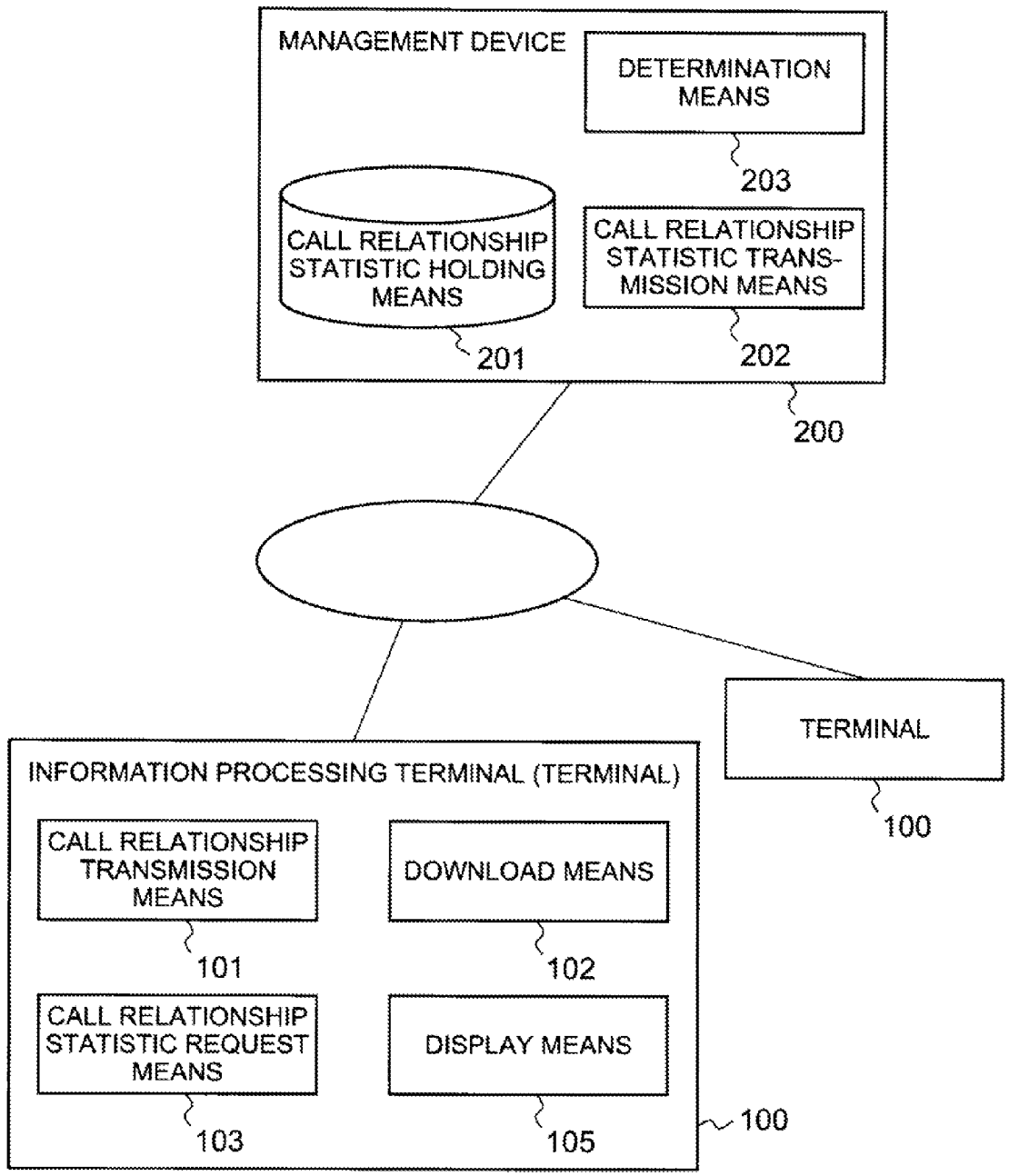
FIG. 17 It depicts a block diagram illustrating still another configuration example of the download system according to the present invention.

FIG. 17 is a block diagram illustrating still another configuration example of the download system according to the present invention. Specifically, relative to the configuration illustrated in FIG. 14, the terminal 100 may further include the call relationship statistic request means 103 and the management device 200 may further include the call relationship statistic transmission means 202 and a determination means 203.

The call relationship statistic request means 103 (for example, the communication means 11 and the Application control means 12) requests the call relationship statistical information from the management device 200 by specifying an application or content data.

The determination means 203 (for example, the judging means 14 in an example of being present in the management server) determines the application or content data to be downloaded into the terminal 100, on the basis of the statistic of the call relationship that the specified application or content data is the first call source, which is indicated by the call relationship statistical information held in the call relationship statistic holding means 201, in response to the request from the terminal 100. In this instance, the call relationship statistic transmission means 202 (for example, the communication means 21) may transmit only the call relationship statistical information related to the application or content data determined by the determination means 203 to the terminal 100, which is a request source. Further, the download means 102 of the terminal 100 may download the call target application or content data included in the acquired call relationship statistical information.

In the same manner as in the determination means 104, the determination means 203 may determine the call target application or content data having the percent of the number of calls equal to or more than a certain threshold value in the statistic of the call relationship that the specified application or content data is the first call source, for example, which is indicated by the call relationship statistical information, as an application or content data to be downloaded into the terminal 100.

While the present invention has been described with reference to exemplary embodiments and working examples thereof, the invention is not limited to these embodiments and working examples. The constitution and details of the present invention can be subjected to various modifications that those skilled in the art can understand, the scope of the present invention.

INDUSTRIAL APPLICABILITY

The present invention is favorably applicable to uses such as an application interaction function in portable information communication terminals and application or content download service.

REFERENCE SIGNS LIST

1 Terminal
11 Communication means
12 Application control means
13 Storage device
131 Application
14 Judging means
15 Call relationship statistical information database (Call relationship statistical information DB)
2 Management server
21 Communication means
22 Call relationship statistical information database (Call relationship statistical information DB)
3 Application server
31 Application
100 Information processing terminal (Terminal)
101 Call relationship transmission means
102 Download means
103 Call relationship statistic request means
104 Determination means
105 Display means
106 Intra-terminal call relationship statistic holding means
200 Management device
201 Call relationship statistic holding means
202 Call relationship statistic transmission means
203 Determination means

The invention claimed is:

1. A download system comprising:
two or more terminals, which download and execute an application or content data; and
a management device, which is connected so as to be able to communicate with each of the terminals,
wherein:
each of the terminals includes:
a call relationship transmission section for transmitting call relationship information, which indicates a call relationship regarding the application or content data executed in each of the terminals, to the management device; and
a download section for downloading the application or content data;
the management device includes:
a call relationship statistic holding section for holding call relationship statistical information, which indicates the statistic of the call relationship regarding the application or content data indicated by the call relationship information received from each terminal; and
the download section downloads the application or content data on the basis of the call relationship statistical information held in the call relationship statistic holding section,
wherein the download section downloads the application or content data on the basis of the statistic of the call relationship indicating that a specified application or content data is a first call source, which is indicated by the call relationship statistical information.
2. The download system according to claim 1, wherein:
each of the terminals includes:

a call relationship statistic request section for requesting the call relationship statistical information from the management device; and a determination section for determining the application or content data to be downloaded on the basis of the acquired call relationship statistical information;

the management device includes:

a call relationship statistic transmission section for transmitting at least a part of the call relationship statistical information, which is held in the call relationship statistic holding section, on the basis of a request from each of the terminals; and the download section of each of the terminals downloads the application or content data determined by the determination section.

3. The download system according to claim 2, wherein:

each of the terminals includes an intra-terminal call relationship statistic holding section for holding the call relationship statistical information including at least the statistic of the call relationship regarding the application or content data executed in each of the terminals; and the call relationship information request section requests the call relationship statistical information from the management device in the case where the intra-terminal call relationship statistic holding section does not have the call relationship statistical information indicating the statistic of the call relationship that the specified application or content data is the first call source.

4. The download system according to claim 2, wherein the determination section determines the call target application or content data having the percent of the number of calls equal to or more than a certain threshold value in the statistic of the call relationship that the specified application or content data is the first call source, which is indicated by the call relationship statistical information, as the application or content data to be downloaded.

5. The download system according to claim 1, wherein:

each of the terminals includes a call relationship statistic request section for requesting the call relationship statistical information from the management device by specifying an application or content data; and the management device includes:

a determination section for determining the application or content data to be downloaded into each of the terminals on the basis of the statistic of the call relationship that the specified application or content data is the first call source, which is indicated by the call relationship statistical information held in the call relationship statistic holding section in response to the request from each of the terminals; and a call relationship statistic transmission section for transmitting only the call relationship statistical information related to the application or content data determined by the determination section to each of the terminals.

6. The download system according to claim 5, wherein the call relationship statistic transmission section transmits information including at least the identifier for identifying the call source application or content data and the identifier for identifying the call target application or content data, as the call relationship statistical information.

7. The download system according to claim 1, wherein the call relationship information includes at least an identifier for identifying the call source application or content data and an identifier for identifying a call target application or content data.

8. The download system according to claim 1, wherein the call relationship statistical information includes at least an identifier for identifying the call source application or content data, an identifier for identifying the call target application or content data, and the number of calls.

9. The download system according to claim 1, wherein each of the terminals includes a display section for displaying the information on the application to be downloaded.

10. An information processing terminal for downloading and executing an application or content data, the terminal comprising:

a call relationship transmission section for transmitting call relationship information, which indicates a call relationship regarding the application or content data executed in the terminal to a predetermined management device, which is connected so as to be able to communicate with two or more terminals including at least the terminal and includes a call relationship statistic holding section for holding call relationship statistical information, which indicates the statistic of the call relationship regarding the application or content data indicated by the call relationship information received from each terminal;

a download section for downloading the application or content data on the basis of the call relationship statistical information held in the call relationship statistic holding section;

a call relationship statistic request section for requesting the call relationship statistical information from the management device; and a determination section for determining the application or content data to be downloaded on the basis of the call relationship statistical information acquired from the management device, wherein the download section downloads the application or content data determined by the determination section.

11. The information processing terminal according to claim 10, further comprising an intra-terminal call relationship statistic holding section for holding call relationship statistical information including at least the statistic of the call relationship regarding the application or content data executed in the terminal, wherein the call relationship information request section requests the call relationship statistical information from the management device in the case where the intra-terminal call relationship statistic holding section does not hold the call relationship statistical information indicating the statistic of the call relationship that a specified application or content data is a first call source.

12. The information processing terminal according to claim 10, wherein the determination section determines a call target application or content data having the percent of the number of calls equal to or more than a certain threshold value in the statistic of the call relationship that the specified application or content data is the first call source, which is indicated by the call relationship statistical information, as the application or content data to be downloaded.

13. The information processing terminal according to claim 10, further comprising a display section for displaying information on the application to be downloaded.

14. A management device connected so as to be able to communicate with two or more terminals, which download and execute an application or content data, the management device comprising:

a call relationship statistic holding section for holding call relationship statistical information, which indicates the statistic of the call relationship regarding the application or content data indicated by the call relationship information received from each terminal;

a call relationship statistic transmission section for transmitting at least a part of the call relationship statistical information held in the call relationship statistic holding section to the terminal on the basis of a request from the terminal; and a determination section for determining an application or content data to be downloaded into the terminal on the basis of the statistic of the call relationship indicating that a specified application or content data is a first call source, which is indicated by the call relationship statistical information held in the call relationship statistic holding section, in response to a request for the call relationship statistical information specifying the application or content data from the terminal, wherein the call relationship statistic transmission section transmits only the call relationship statistical information regarding the application or content data determined by the determination section to the terminal.

15. The management device according to claim 14, wherein the determination section determines a call target application or content data having the percent of the number of calls equal to or more than a certain threshold value in the statistic of the call relationship that the specified application or content data is the first call source, which is indicated by the call relationship statistical information, as the application or content data to be downloaded.

16. A download method in which a terminal downloads an application or content data, the method comprising the steps in which:

two or more terminals transmit call relationship information, which indicates a call relationship regarding the application or content data executed in the terminal, to the management device;

the management device updates and holds call relationship statistical information, which indicates the statistic of the call relationship regarding the application or content data indicated by the call relationship information received from each of the terminals; and the terminal downloads the application or content data on the basis of the call relationship statistical information held in the management device, wherein the application or content data is downloaded on the basis of the statistic of the call relationship indicating that a specified application or content data is a first call source, which is indicated by the call relationship statistical information.

17. The download method according to claim 16, further comprising the steps in which:

the terminal requests the call relationship statistical information from the management device; and the management device transmits at least a part of the call relationship statistical information held in the call relationship statistic holding section to the terminal on the basis of a request from the terminal; and the terminal determines the application or content data to be downloaded on the basis of the acquired call relationship statistical information.

18. The download method according to claim 17, further comprising the steps in which:

the terminal updates and holds the call relationship statistical information including at least the statistic of the call relationship regarding the application or content data executed in the terminal; and the terminal requests the call relationship statistical information from the management device in the case where the terminal does not hold the call relationship statistical information indicating the statistics of the call relationship that the specified application or content data is the first call source.

19. The download method according to claim 17, wherein the terminal or management device determines the call target application or content data having the percent of the number of calls equal to or more than a certain threshold value in the statistic of the call relationship that the specified application or content data is the first call source, which is indicated by the call relationship statistical information, as the application or content data to be downloaded.

20. The download method according to claim 16, further comprising the steps in which:

the terminal requests the call relationship statistical information from the management device by specifying an application or content data;

the management device determines the application or content data to be downloaded into the terminal on the basis of the statistic of the call relationship that the specified application or content data is the first call source, which is indicated by the call relationship statistical information held in the call relationship statistic holding section, on the basis of the request from the terminal; and the management device transmits only the call relationship statistical information related to the determined application or content data to the terminal.

21. The download method according to claim 16, wherein the terminal displays the information on the application to be downloaded.

22. A non-transitory computer readable information recording medium storing a download program used for an information processing terminal, which downloads and executes an application or content data, when executed by a processor that has an intra-terminal call relationship statistic holding section for holding call relationship statistical information including at least the statistic of the call relationship regarding the application or content data executed in the terminal, performs:

processing of transmitting call relationship information, which indicates a call relationship regarding the application or content data executed in the terminal to a predetermined management device, which is connected so as to be able to communicate with two or more terminals including at least the terminal and includes a call relationship statistic holding section for holding call relationship statistical information, which indicates the statistic of the call relationship regarding the application or content data indicated by the call relationship information received from each terminal;

processing of downloading the application or content data on the basis of the call relationship statistical information held in the call relationship statistic holding section;

processing of determining the application or content data to be downloaded on the basis of the call relationship statistical information acquired from the management device;

processing of downloading the determined application or content data; and processing of requesting the call relationship statistical information from the management device in a case in which the intra-terminal call relationship statistic holding section does not hold the call relationship statistical information indicating the statistic of the call relationship that a specified application or content data is a first call source.

23. The non-transitory computer readable information recording medium according to claim 22, further comprising: determining a call target application or content data having the percent of the number of calls equal to or more than a certain threshold value in the statistic of the call relationship that the specified application or content data is the first call source, which is indicated by the call relationship statistical information, as the application or content data to be downloaded.

24. The non-transitory computer readable information recording medium according to claim 22, further comprising: processing of displaying information on the application to be downloaded.

25. A non-transitory computer readable information recording medium storing a download program used for a management device, which is connected so as to be able to communicate with two or more terminals for downloading and executing an application or content data, the program causing a computer, which has a call relationship statistic holding section for holding call relationship statistical information indicating the statistic of the call relationship regarding the application or content data indicated by the call relationship information received from each terminal, when executed by a processor, performs processing of transmitting at least a part of the call relationship statistical information held in the call relationship statistic holding section to the terminal on the basis of a request from the terminal; and processing of determining an application or content data to be downloaded into the terminal on the basis of the statistic of the call relationship indicating that a specified application or content data is a first call source, which is indicated by the call relationship statistical information held in the call relationship statistic holding section, in response to a request for the call relationship statistical information specifying the application or content data from the terminal.

26. The non-transitory computer readable information recording medium according to claim 25, further comprising: determining a call target application or content data having the percent of the number of calls equal to or more than a certain threshold value in the statistic of the call relationship that the specified application or content data is the first call source, which is indicated by the call relationship statistical information, as the application or content data to be downloaded.

* * * * *